(12) United States Patent
Matsumoto et al.

(10) Patent No.: US 7,356,543 B2
(45) Date of Patent: Apr. 8, 2008

(54) STRUCTURED DOCUMENT DATA, CONTENTS PROCESSING METHOD, PROGRAM FOR IMPLEMENTING THAT PROCESS, AND STORAGE MEDIUM STORING PROGRAM

(75) Inventors: Kentaro Matsumoto, Tokyo (JP); Yuji Kobayashi, Kanagawa (JP); Katsuki Ishii, Arlington, MA (US); Hirowo Inoue, Kanagawa (JP); Yuji Suga, Kanagawa (JP); Hidetomo Sohma, Kanagawa (JP); Masahiko Takaku, Kanagawa (JP); Jun Fujisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 502 days.

(21) Appl. No.: 10/921,902

(22) Filed: Aug. 20, 2004

(65) Prior Publication Data

US 2005/0080812 A1  Apr. 14, 2005

(30) Foreign Application Priority Data

Aug. 22, 2003  (JP) .............................. 2003-208411

(51) Int. Cl.
G06F 17/00 (2006.01)
H04N 5/76 (2006.01)
(52) U.S. Cl. .................................... 707/102; 348/231.2
(58) Field of Classification Search ................ 707/102; 348/231.2, 231.99, 231.6
See application file for complete search history.

(56) References Cited

U.S. PATENT DOCUMENTS

2002/0107973 A1  8/2002  Lennon et al. .............. 709/231
2002/0135685 A1*  9/2002  Tsunoda ................... 348/231.2
2002/0145753 A1  10/2002  Inoue et al. ................ 358/1.15
2004/0093376 A1*  5/2004  De Boor et al. ............ 709/203
2005/0160111 A1*  7/2005  Plastina et al. ............. 707/102

FOREIGN PATENT DOCUMENTS

JP    2001-169237    6/2001
JP    2002-236695    8/2005

OTHER PUBLICATIONS

SMIL, http://www.webmonkey.com/webmonkey/00/41/index4a_page4.html?tw=authoring (Mar. 18, 2006).*
U.S. Appl. No. 10/921,909, filed Aug. 20, 2004.

* cited by examiner

Primary Examiner—Wilson Lee
Assistant Examiner—Angela M Lie
(74) Attorney, Agent, or Firm—Fitzpatrick, Cella, Harper & Scinto (57) ABSTRACT

This invention provides structured document data and a contents processing method, which can assure high versatility and process each individual required information using an application corresponding to processing performance in each device, so as to solve the problems in the aforementioned conventional description method. Structured document data according to this invention has designation information that designates an item position of a list held in a first document element which holds item information associated with a reference destination of contents as a list, and a second document element that holds information required to present the contents at the reference destination described in the item information corresponding to the designation information.

8 Claims, 6 Drawing Sheets

```
<mdf:mdf mdf:version="1.0">
  <mdf:collection>
    <object type="image/jpeg" src="/image0001.jpg"/>
    <object type="image/jpeg" src="/image0002.jpg"/>
    <object type="image/jpeg" src="/image0003.jpg"/>
  </mdf:collection>
  <mdf:presentation>
    <current_position>0</current_position>
    <image x="100" y="200" width="200" height="150" src="xpointer(//object[@type=image/jpeg][current_position()+1]"/>
  </mdf:presentation>
  <mdf:interaction>
    <printcount>3</printcount>
    <owner>
      <name>tanaka</name>
      <address>tokyo</address>
      <mail>tanaka@abccampany.co.jp</mail>
    </owner>
  </mdf:interaction>
</mdf:mdf>
```

FIG. 1

```
<html>
<head>
    <style>
        @page{size:landscape}
        img.gray{width:480; height:390;}
    <style>
</head>
<body>
    <img src="http://www.abccompany.com/image/seaside1.jpeg" left="100" top="200" class="gray"/>
    <img src="http://www.abccompany.com/image/seaside2.jpeg" left="200" top="100" class="gray"/>
    <ul>
        <li>    faces #2
        <li>    date:2003/10/23
        <li>    seaside
    <ul>
</body>
</html>
```

FIG. 2

```
<mdf:mdf mdf:version="1.0">
<mdf:collection>
    <object type="image/jpeg" src="/image0001.jpg"/>
    <object type="image/jpeg" src="/image0002.jpg"/>
    <object type="image/jpeg" src="/image0003.jpg"/>
</mdf:collection>
<mdf:presentation>
    <current_position>0</current_position>
    <image x="100" y="200" width="200" height="150" src="xpointer(//object[@type=image/jpeg][current_position()+1]"/>
</mdf:presentation>
<mdf:interaction>
    <printcount>3</printcount>
    <owner>
        <name>tanaka</name>
        <address>tokyo</address>
        <mail>tanaka@abccampany.co.jp</mail>
    </owner>
</mdf:interaction>
</mdf:mdf>
```

STRUCTURED DOCUMENT DATA, CONTENTS PROCESSING METHOD, PROGRAM FOR IMPLEMENTING THAT PROCESS, AND STORAGE MEDIUM STORING PROGRAM

FIELD OF THE INVENTION

The present invention relates to a description method of a structured document described using, e.g., XML or the like.

BACKGROUND OF THE INVENTION

Figure 1:
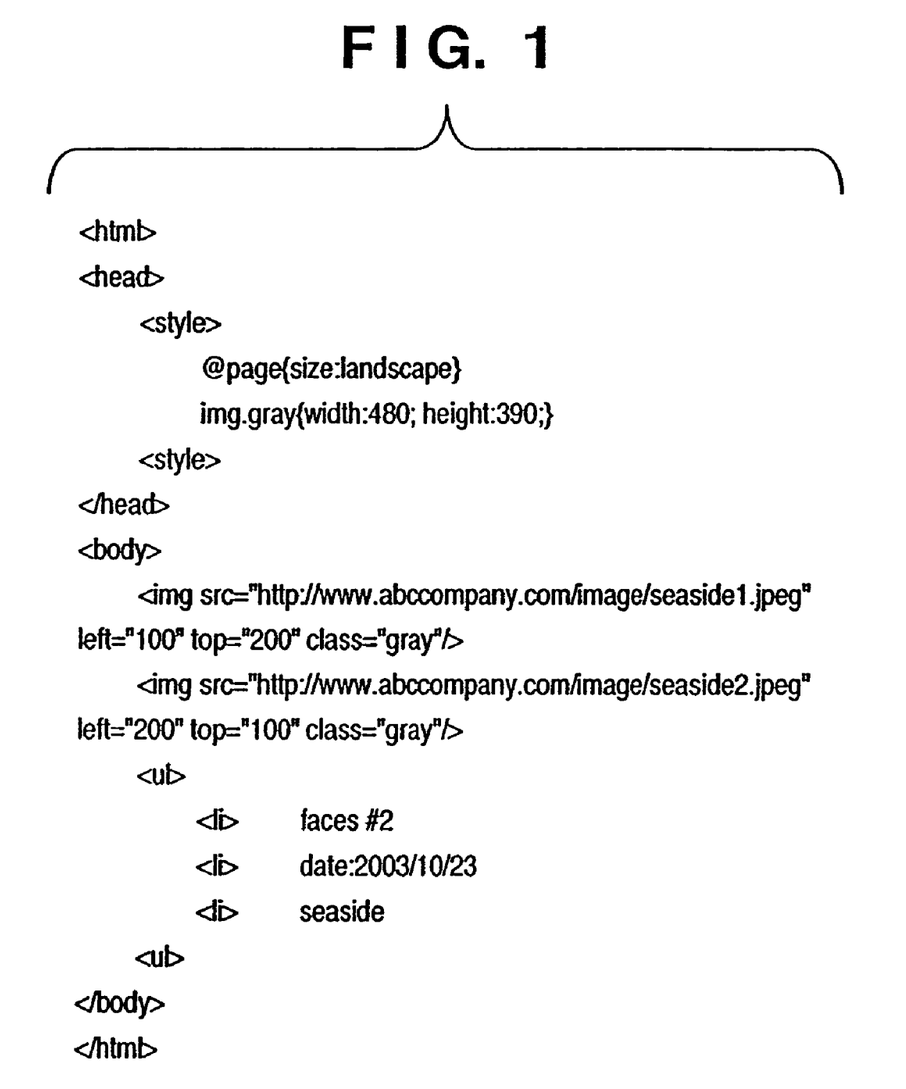
FIG. 1 shows a description example of a conventional structured document.

A HTML document is described, as shown in FIG. 1. In a browser (device) such as a personal computer (PC) or the like, a processor parses such HTML document, and passes the parsing result to an application. The application processes to determine how to display the HTML document on the basis of the passed data.

However, the HTML document shown in FIG. 1 is premised on that the processor parses all elements of such HTML document and the application processes based on the parsing result. In other words, the device requires a large-scale application that can process the entire HTML document so as to understand the HTML document.

As a related art of the HTML document, an XML document is known. CSS2 and XLS are used as style designation languages for this XML document. However, since each of these style designation languages designates a style by referring to tags in a specific XML document, they cannot cope with XML documents with different tag descriptions, resulting in poor versatility.

SUMMARY OF THE INVENTION

The present invention provides structured document data and a contents processing method, which can assure high versatility and process each individual required information using an application corresponding to processing performance in each device, so as to solve the problems in the aforementioned conventional description method.

Structured document data according to the present invention comprises designation information that designates an item position of a list held in a first document element which holds item information associated with a reference destination of contents as a list, and a second document element that holds information required to present the contents at the reference destination described in the item information corresponding to the designation information, and in that the second document element is described in a format separated from the first document element.

A contents processing method according to the present invention comprises a parsing step of parsing structured document data having designation information that designates an item position of a list held in a first document element which holds item information associated with a reference destination of contents as a list, and a second document element that holds information required to present the contents at the reference destination described in the item information corresponding to the designation information, a reference instruction step of issuing a reference instruction of the item position of the list held in the first document element in accordance with a parsing result in the parsing step, an acquisition step of acquiring contents referred to in the reference instruction step, and a processing step of processing the contents acquired in the acquisition step on the basis of the information required to present the contents at the reference destination in the second document element parsed in the parsing step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DETAILED DESCRIPTION OF THE PREFERRED EMBODIMENTS

Preferred embodiments of the present invention will now be described in detail in accordance with the accompanying drawings.

Figure 2:
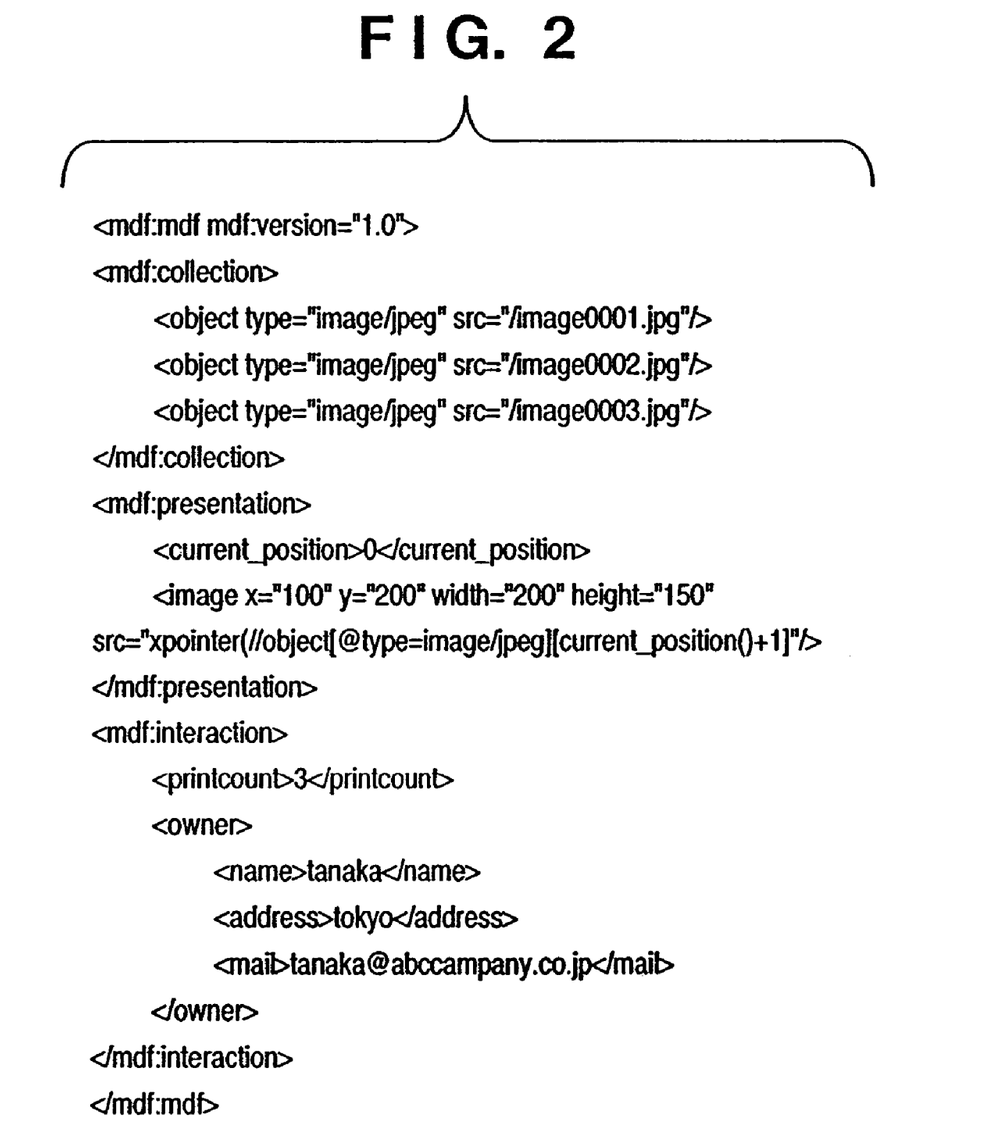
FIG. 2 shows an example of a description of a structured document according to the present invention.

FIG. 2 shows a description method of a structured document according to an embodiment of the present invention. In a structured document of this embodiment, an 'mdf: collection' element, 'mdf:presentation' element, and 'mdf: interaction' element are described in a format separated into individual parts (sibling relationships) in place of a parent-child relationship. Note that the description of the structured document shown in FIG. 1 complies with XML.

In FIG. 2, the 'mdf:collection' element plays a role of storing collection information (list information) of a common function of the structured document in this embodiment. More specifically, an element corresponding to an 'mdf:collection' tag in FIG. 2 holds a list of items indicating media types of contents to be referred to and URIs of reference destinations as "collection".

The 'mdf:presentation' element describes information associated with presentation (more specifically, information associated with presentation of contents such as an image for thumbnail display, print data for color print, print data for monochrome print, an audio description file for an audio interface, and the like) as a common function of the structured document in this embodiment. For example, an element corresponding to an 'mdf:presentation' tag of the structured document shown in FIG. 2 designates the display position and size of an image by a field 'imagex="100" y="200" width="200" height="150"'. Also, a field 'src="xpointer(//OBJECT[@type=image/jpeg] [current_position( )+1])"' holds information that refers to the first one of items of a list held by 'mdf:collection' element since the type of contents (attribute of media type) is 'image/jpeg' and current_position( ) is 0 (designates the position in a list upon classification based on the types of contents).

On the other hand, 'mdf:interaction' holds information associated with security or information associated with control such as a job ticket as a common function of the structured document in this embodiment. An element corresponding to an 'mdf:interaction' tag in FIG. 2 holds a 'printcount' element as access management information associated with the remaining printable count, and an 'owner' element as owner information of the structured document.

Figure 3:
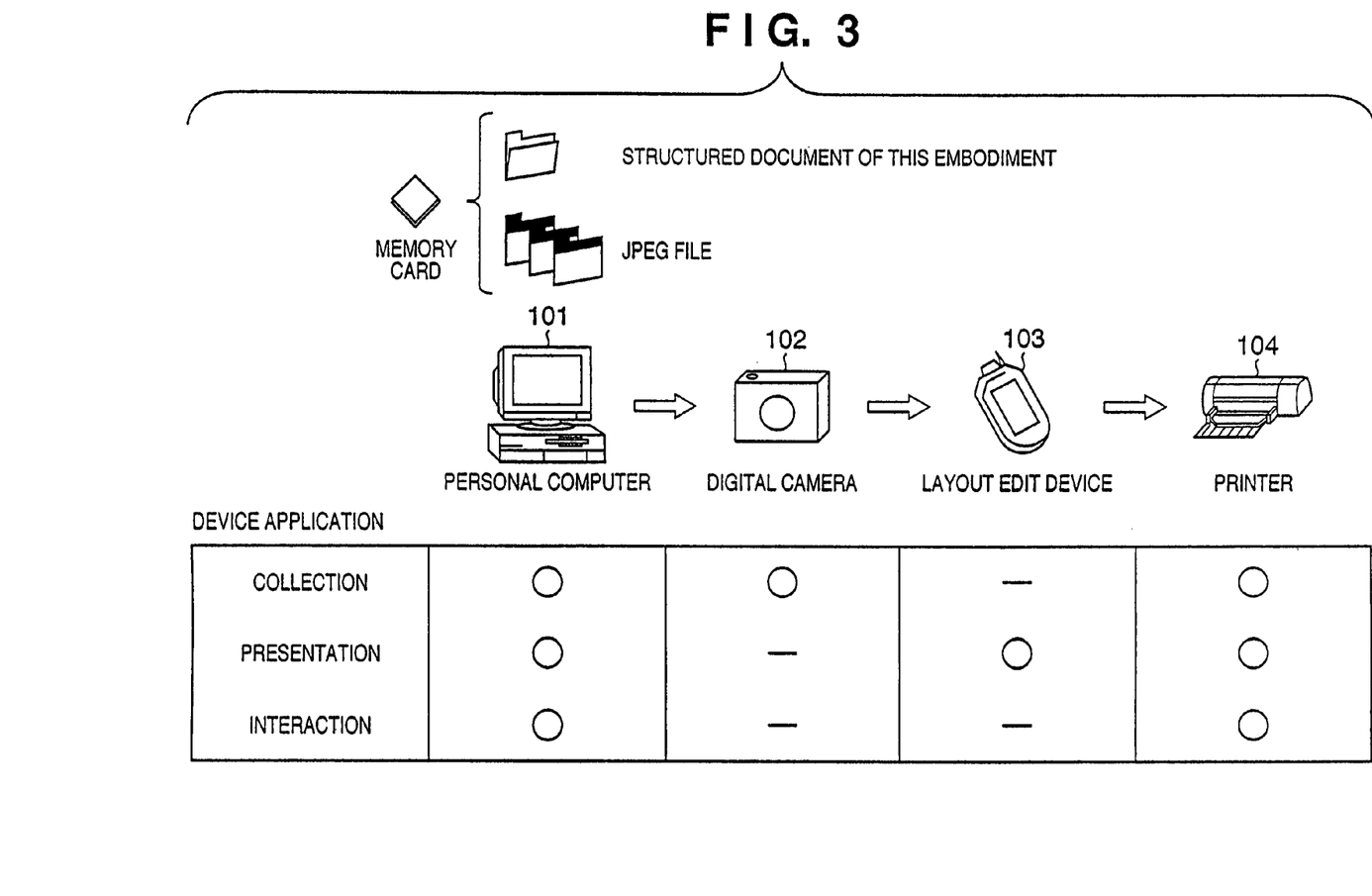
FIG. 3 shows a use example of a structured document according to the present invention.
Figure 4:
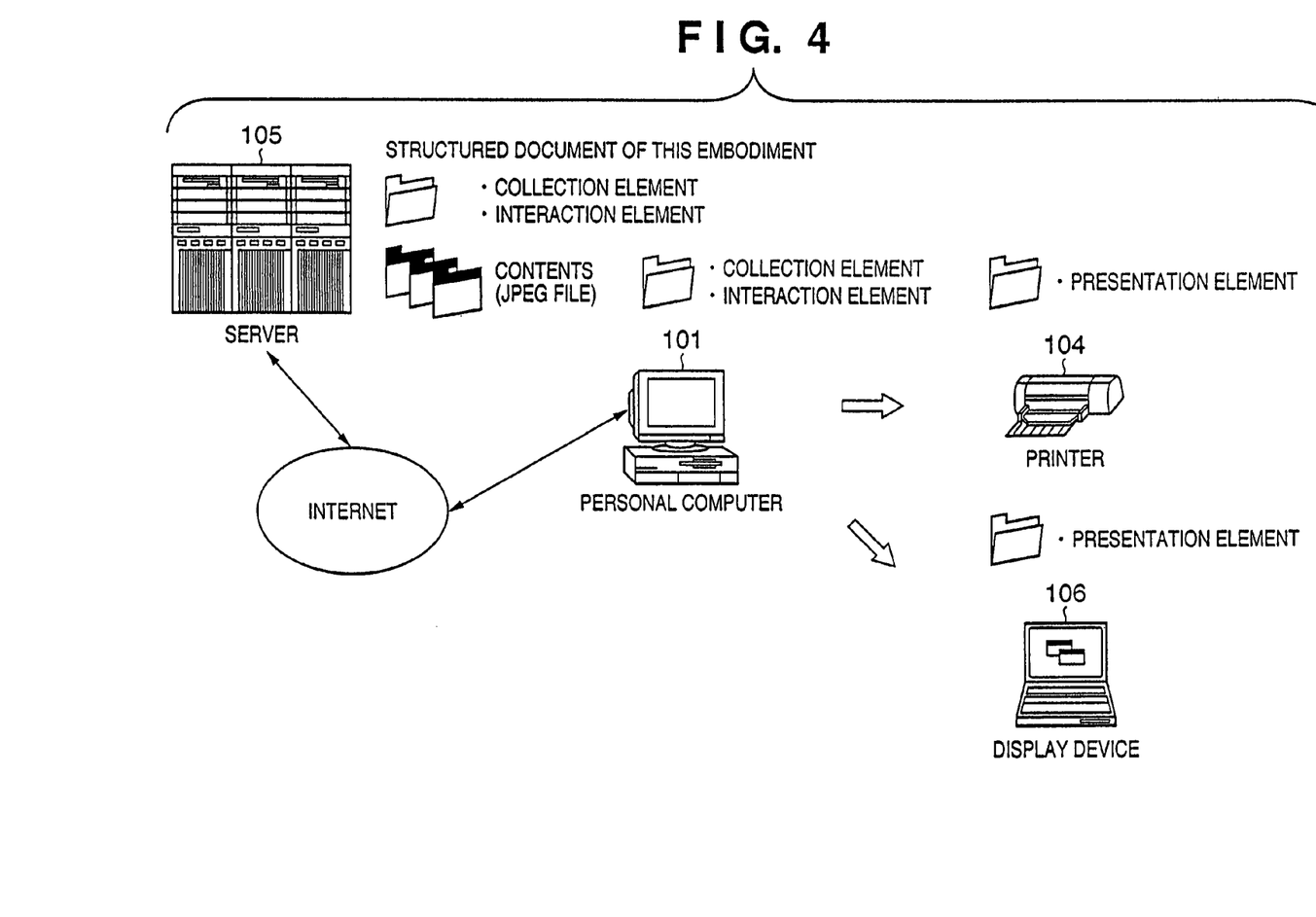
FIG. 4 shows a use example of a structured document according to the present invention.
Figure 5:
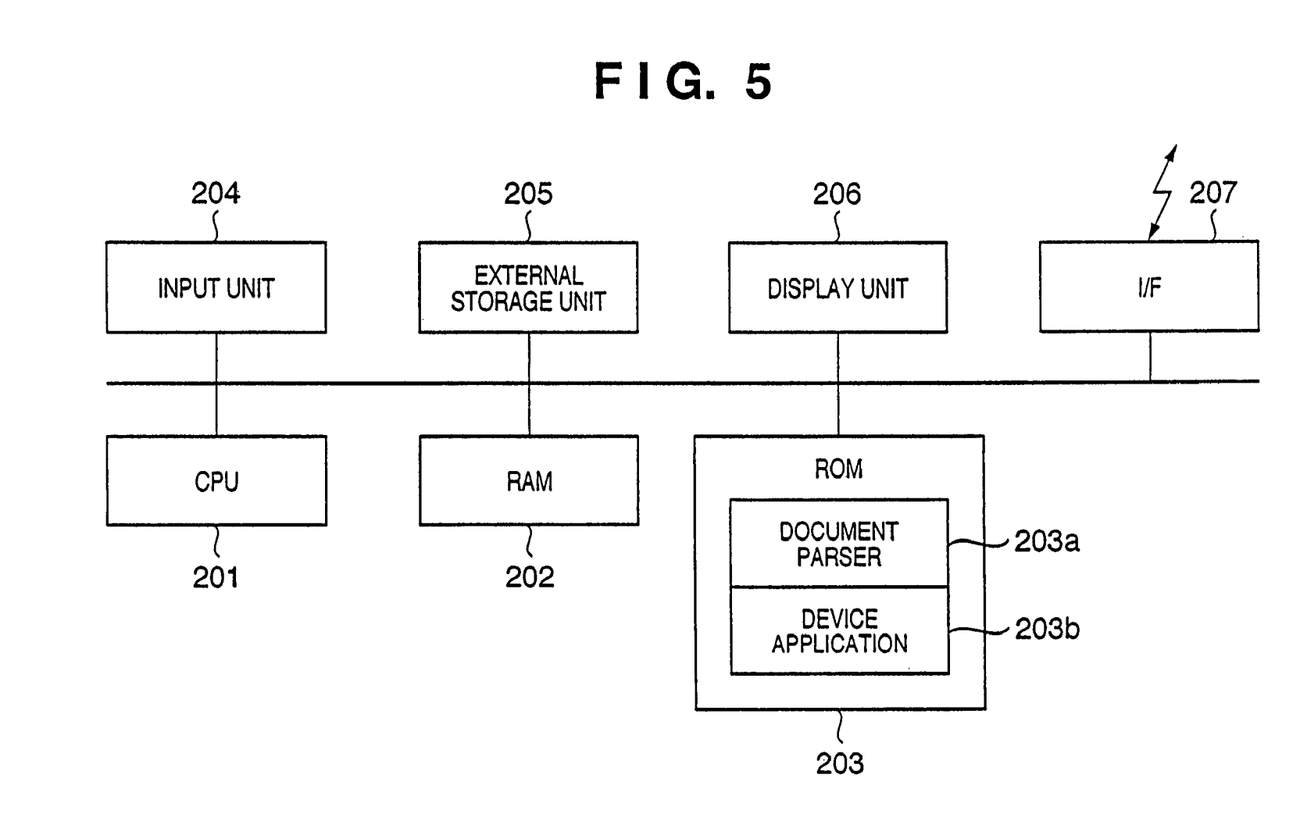
FIG. 5 is a block diagram showing the arrangement of each device.
Figure 6:
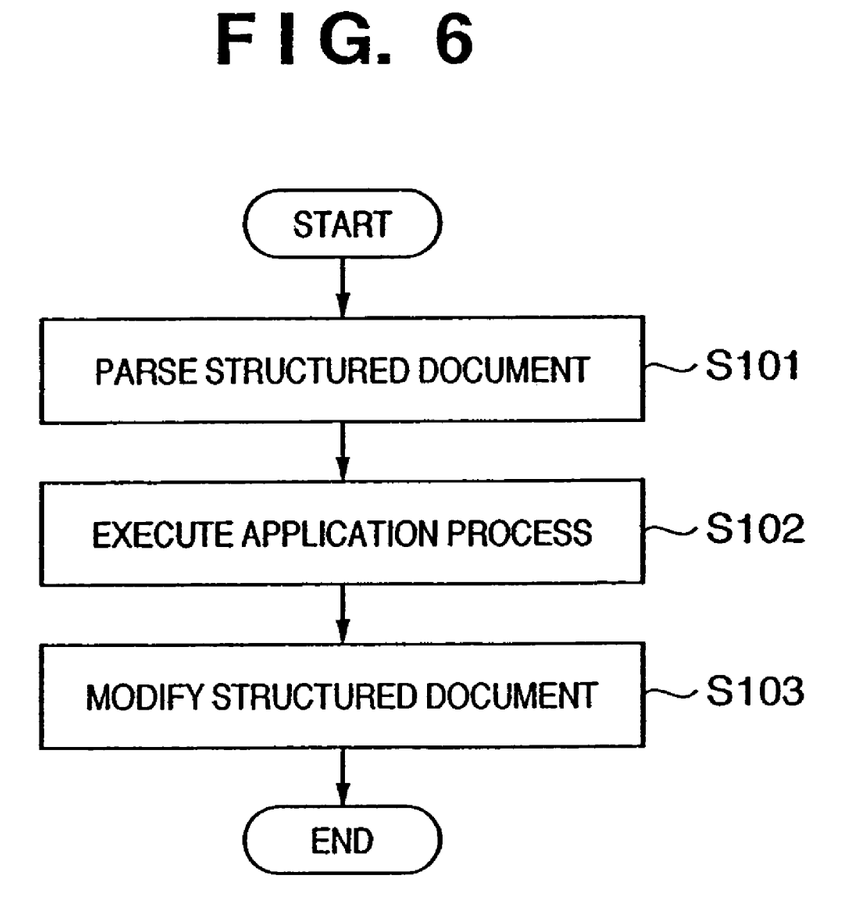
FIG. 6 is an operation processing flowchart of each device.

FIGS. 3 and 4 show processing examples of respective devices using the structured document of this embodiment. FIG. 5 shows a general hardware arrangement of devices 101 to 106 shown in FIGS. 3 and 4. FIG. 6 shows an operation processing flowchart in each device.

Referring to FIG. 5, a CPU 201 reads out and executes a predetermined program from a ROM 203 so as to systematically control the respective units of the device, thus implementing various processes. A RAM 202 provides a work area required for processes by the program. The ROM 203 stores various programs, as described above, and especially has a document parser 203a for parsing a structured document as a characteristic program of this embodiment. Respective devices have different application programs according to their purposes as a device application 203b. Assume that each device has a analysis program which can understand a markup language "mdf". An input device 204 comprises a keyboard, mouse, cross-cursor keys, and the like. An external storage unit 205 is used to mount a detachable nonvolatile memory card. A display unit 206 displays contents by a presentation method processed by the aforementioned application program. An I/F (interface) 207 is used to connect an external device or the Internet or the like.

The operation process by each device shown in FIG. 5 will be explained below with reference to FIG. 6. In step S101, the document parser 203a parses the structured document of this embodiment, as shown in FIG. 2, to convert it into objects. In step S102, an application unique to each device is executed. In step S103, the structured document is dynamically changed in accordance with the processing result of the application in step S102.

A processing example in respective devices when the structured document of this embodiment is used offline will be described below using FIG. 3. FIG. 3 will explain a processing example when a JPEG-compressed image file is stored in a memory card as contents together with the structured document of this embodiment.

Initially, in FIG. 3, a personal computer 101 comprises device applications associated with the collection element, presentation element, and interaction element of the structured document of this embodiment. More specifically, in the following description, a contents delete/add function corresponds to a device application 203b associated with the collection element, an image edit/display function (e.g., a digital photo album) corresponds to a device application 203b associated with the presentation element, and a print count limit function corresponds to a device application 203b associated with the interaction element.

In FIG. 3, assume that the PC (personal computer) 101 stores a structured document file shown in FIG. 2 and JPEG files as contents in a memory card.

Also, assume that this memory card is attached to a digital camera 102. At this time, assume that 'image0001.jpg' of JPEG files in the memory card is deleted by the function of the device application in the digital camera 102. The description in the structured document shown in FIG. 2 is modified in correspondence with this process of the device application. More specifically, a description <object type="image/jpeg" src="/image0001.jpg"/> is deleted.

However, since the presentation element of the structured document of this embodiment has a description that designates the item position of a list in the collection element, the digital camera 102 need not modify the presentation element upon deletion of contents. In other words, the digital camera 102 need not have any image display/edit function.

Also, when a new JPEG file is added by the photographing operation of the digital camera 102, <object type="image/jpeg" src="/image0004.jpg"/> need only be added to the structured document, and the digital camera 102 need not have any image display/edit function.

Assume that the memory card is attached to a layout edit device 103 after the processing in the digital camera 102. When image display edit contents are modified by the process of the device application of the layout edit device 103 while a description <object type="image/jpeg" src="/image0001.jpg"/> is deleted, the description of the presentation element in the structured document is changed in correspondence with that modification. For example, when the device application executes a process for changing display from 'image0002.jpg' to 'image0003.jpg', the description of the presentation element is changed like:

<imagex="100" y="200" width="200" height="150" sec="xpointer(//object[@type=image/jpeg] [current_position( )+2])"/>

That is, since the position of the item of the list in the collection element is designated, the layout edit device 103 need not install any device application that deletes 'image0001.jpg'.

Assume that the memory card is attached to a printer 104 with a card slot after the process in the layout edit device 103. The printer 104 executes a print process in correspondence with the processes by the digital camera 102 and layout edit device 103. After execution of the print process, <printcount>3</printcount> as the interaction element in the structured document is modified to <printcount>2</printcount>. That is, the remaining printable count is limited from three to two.

As described above, with the structured document of this embodiment, appropriate processes can be executed without increasing application functions of respective devices.

A processing example in respective devices when the structured document of this embodiment is used online will be described below using FIG. 4. More specifically, in FIG. 4, a PC 101, printer 104, and display device 106 are connected online. In FIG. 4, assume that a structured document and JPEG files as contents are downloaded from a server 105 to the PC 101 via a network (e.g., the Internet or the like) in advance.

The structured document downloaded to the PC 101 does not include any description <mdf:presentation> of the presentation element shown in FIG. 2. The printer 104 and display device 106 respectively store structured documents with corresponding descriptions of the presentation element.

Assume that a print instruction is output from the PC 101 to the printer 104. In the printer 104, the document parser 203a parses the presentation element of the structured document held by itself. The device application 203b transmits a command that refers to the item position of the list included in the collection element described in this presentation element to the PC 101 as a result of parsing. The PC 101 transfers contents (JPEG file) corresponding to the item position of the list corresponding to the command transmitted from the printer 104 to this printer 104. The printer 104 executes a print process of the transferred contents on the basis of a description of an edit process of the presentation element.

A process in the display device 106 is executed in the same manner as that in the printer 104. Assume that a display instruction is output from the PC 101 to the display device 106. In the display device 106, the document parser 203*a* parses the presentation element of the structured document held by itself. The device application 203*b* transmits a command that refers to the item position of the list included in the collection element described in this presentation element to the PC 101 as a result of parsing. The PC 101 transfers contents (JPEG file) corresponding to the item position of the list corresponding to the command transmitted from the display device 106 to the display device 106. The display device 106 executes a display process of the transferred contents on the basis of a description of an edit process of the presentation element held by itself.

As described above, since a device having the presentation element makes a description that designates the item position of the list held in the collection element, a device that holds contents can hold the contents irrespective of the specification and processing mode of a contents transfer destination (the device having the presentation element). That is, a device that processes contents (the device having the presentation element) holds a structured document that describes the corresponding presentation element, thus allowing easy management of contents.

As described above, using the structured document of this embodiment, each device need not hold excessive applications, and appropriate processes can be done among devices.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-208411 filed on Aug. 22, 2003, the entire contents of which are hereby incorporated by reference herein.

What is claimed is:

1. A computer-readable storage medium on which is stored structured document data executable by a contents processor, the structured document data comprising:
   a first document element that holds a list of items, each item indicating a reference destination of a content; and
   a second document element that holds designation information for designating an item position of the list of items in the first document element, and presentation information to present a content at the reference destination described in an item corresponding to the item position of the list of items,
   wherein the first and second document elements are described in separate formats as separate sections in the structured document data,
   wherein, in executing the structured document data, the contents processor i) parses the structured document data, ii) references the item position of the list in the first document element in accordance with the designation information in the parsed structured document, iii) acquires a content at a reference destination corresponding to the referenced item position, and iv) processes the acquired content on the basis of the presentation information to present the acquired content.

2. The computer-readable storage medium according to claim 1, wherein the second document element refers to the item held in the first document element based on a type of content.

3. The computer-readable storage medium according to claim 1, wherein a third document element that holds security information is stored in a different part in the structured document.

4. A contents processing method comprising:
   a parsing step of parsing structured document data having a first document element that holds a list of items, each item indicating a reference destination of a contents, and a second document element that holds designation information for designating an item position of the list of items in the first document element, and presentation information to present a content at the reference destination described in an item corresponding to the item position of the list of items;
   a reference step of referencing the item position of the list in the first document element in accordance with the designation information in the structured document data parsed in the parsing step;
   an acquisition step of acquiring a content at a reference destination corresponding to the item position referred in the reference step; and
   a processing step of processing the content acquired in the acquisition step on the basis of the presentation information to present the content acquired in the acquisition step.

5. The method according to claim 4, wherein the second document element refers to the item held in the first document element based on a type of content.

6. The method according to claim 4, wherein a third document element that holds security information is stored in a different pan in the structured document.

7. A computer-readable storage medium, on which is stored a computer program for implementing a contents processing method, comprising:
   program code to implement a parsing step of parsing structured document data having a first document element that holds a list of items, each item indicating a reference destination of a content, and a second document element that holds designation information for designating an item position of the list of items in the first document element, and presentation information to present a content at the reference destination described in an item corresponding to the item position of the list of items;
   program code to implement a reference step of referencing the item position of the list in the first document element in accordance with the designation information in the structured document data in the parsing step;
   program code to implement an acquisition step of acquiring a content at a reference destination corresponding to the item position referred in the reference step; and
   program code to implement a processing step of processing the content acquired in the acquisition step on the basis of the presentation information to present the content acquired in the acquisition step.

8. A structured document data generation method for generating a structured document data formed of a plurality of function elements, comprising:
   a designation information generation step of generating a first document element that holds a list of items, each item indicating a reference destination of a content; and
   a presentation information generation step of generating a second document element that holds designation information for designating an item position of the list of items in the first document element, and presentation information to present a content at the reference destination described in an item corresponding to the item position of the list of items,
   wherein the first and second document elements are described in separate formats as separate sections in the structured document data.

* * * * *

UNITED STATES PATENT AND TRADEMARK OFFICE
CERTIFICATE OF CORRECTION

PATENT NO. : 7,356,543 B2 Page 1 of 1
APPLICATION NO. : 10/921902
DATED : April 8, 2008
INVENTOR(S) : Matsumoto et al.

It is certified that error appears in the above-identified patent and that said Letters Patent is hereby corrected as shown below:

COVER SHEET:
Item (56) Foreign Patent Documents, "JP 2002-236695   8/2005" should read -- JP 2002-236695  8/2002 --.

COLUMN 3:
Line 23, "a" should read -- an --.

COLUMN 5:
Line 54, "scrip" should read -- script --; and
Line 55, "Example" should read -- Examples --.

COLUMN 6:
Line 54, "data," should read -- data, and --.

COLUMN 7:
Line 8, "contents," should read -- content, --; and
Line 31, "pan" should read -- part --.

Signed and Sealed this

Twenty-first Day of October, 2008

JON W. DUDAS
*Director of the United States Patent and Trademark Office*